United States Patent [19]

Shaw et al.

[11] Patent Number: 4,730,808

[45] Date of Patent: Mar. 15, 1988

[54] FLUE GAS SHUT-OFF VALVE

[75] Inventors: Donald F. Shaw, Denville; Arthur A. Lietz, Oakhurst, both of N.J.

[73] Assignee: Exxon Research and Engineering Company, Florham Park, N.J.

[21] Appl. No.: 15,706

[22] Filed: Feb. 17, 1987

[51] Int. Cl.⁴ ............................................. F16K 3/00
[52] U.S. Cl. .................................... 251/326; 251/328; 251/193
[58] Field of Search ............... 251/159, 195, 196, 203, 251/204, 326, 327, 328, 329, 175, 193

[56] References Cited

U.S. PATENT DOCUMENTS

| | | | |
|---|---|---|---|
| 1,720,938 | 7/1929 | Veenschoten | 251/326 |
| 2,064,567 | 12/1936 | Riley | 251/203 |
| 2,614,792 | 10/1952 | Trefil | 251/195 |
| 2,835,469 | 5/1958 | Rothenberger | 251/326 |
| 2,982,513 | 5/1961 | Krummel | 251/203 |
| 3,170,670 | 2/1965 | Johnstone | 251/326 |
| 3,212,753 | 10/1965 | Milette | 251/328 |
| 3,258,244 | 6/1966 | Hilton | 251/203 |
| 3,610,574 | 10/1971 | Hartman | 251/193 |
| 3,945,606 | 3/1976 | McDonald | 251/329 |
| 4,506,865 | 3/1985 | Bragin et al. | 251/326 |

FOREIGN PATENT DOCUMENTS 2521249  8/1983  France ................. 251/327

*Primary Examiner*—George L. Walton
*Attorney, Agent, or Firm*—Joseph J. Dvorak

[57] ABSTRACT

The slide valve of the present invention is adapted for use in horizontal piping runs. It comprises a valve body, an orifice plate, a sliding plate and guide means for the sliding plate. The orifice plate is located in the valve body and inclined at an angle, $\alpha$, selected to achieve a predetermined seating force when the sliding plate, also inclined, is in the valve body in the closed position and bearing on the orifice plate. The guide means are provided for guiding the slide plate when it is moved in and out of the valve body under conditions of use.

10 Claims, 5 Drawing Figures

FLUE GAS SHUT-OFF VALVE

FIELD OF THE INVENTION

This invention relates generally to shut-off valves and, more particularly, to valves employing a gate or sliding plate as a means of controlling the flow of fluid through the valve body.

BACKGROUND OF THE INVENTION

There are a wide variety of gate or sliding plate valves known in the art. Typical examples of such prior art valves are set forth below.

U.S. Pat. No. 564,378 discloses a gate valve which has a renewable seat so that when the seat becomes worn and the valve leaks, the seat may be readily replaced to provide appropriate sealing.

U.S. Pat. No. 2,048,696 discloses a valve having a retractable damper which is water cooled to prevent warpage and which is positioned in relation to an air inlet so that air pressure, stack suction and damper weight help to keep the damper against the seat of the valve.

U.S. Pat. No. 2,580,595 discloses a sliding plate valve in which the plate is oriented horizontally and in which a tubular sleeve is employed to clamp the plate against the valve seat.

U.S. Pat. No. 2,946,349 discloses a plate valve in which the plate is vertically operated and which has a specially designed, shiftable clamp member to facilitate operating the plate valve.

U.S. Pat. No. 4,506,865 discloses a valve housing for a gate valve which has ribs provided along the lower portion of the wall of the housing. These ribs apparently operate to collect particulate matter from the fluids passing through the valve, thereby forming a layer of solids which protects the valve housing from abrasion.

Notwithstanding the foregoing, there still remains a need for shut-off valves that can be used in piping systems carrying high temperature gases. Indeed, there is a particular need for shut-off valves that can be used in horizontal piping runs bearing high temperature gases.

SUMMARY OF THE INVENTION

The slide valve of the present invention is adapted for use in horizontal piping runs. It comprises a valve body, an orifice plate, a sliding plate and guide means for the sliding plate. The orifice plate is located in the valve body and inclined at an angle, $\alpha$, selected to achieve a predetermined seating force when the sliding plate, also inclined, is in the valve body in the closed position and bearing on the orifice plate. The guide means are provided for guiding the slide plate when it is moved in and out of the valve body under conditions of use.

DETAILED DESCRIPTION OF THE DRAWINGS

The invention will be described now in greater detail with reference to specific embodiments thereof shown in the accompanying drawings.

Figure 1:
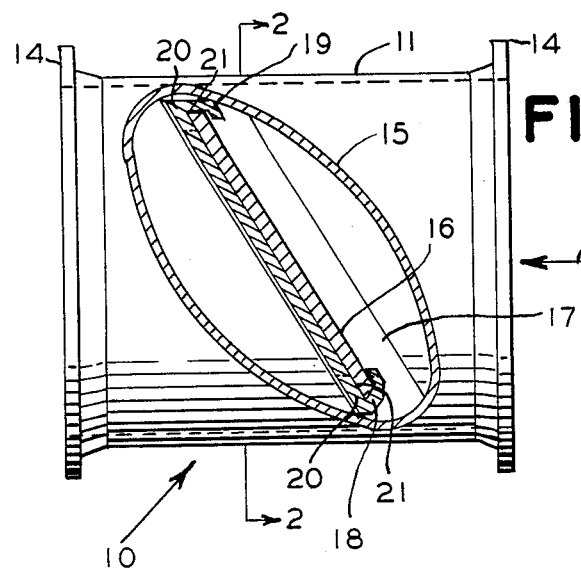
FIG. 1 is a side view, partly in section, of the valve of the present invention.

Referring now to FIG. 1, the valve 10 comprises a horizontally-elongated, generally cylindrical valve body 11 through which fluid flows in the direction shown by arrow 12. Each end of valve body 11 is provided with flanges 14 for attachment of the valve to a pipe system. Alternatively, the valve may be connected to a pipe system by other suitable means, such as threaded connections, welding and the like. Valve bonnet 15 is horizontally disposed on one side of the valve body 11 to accommodate the horizontal movement of sliding plate 16 along an axis perpendicular relative to the longitudinal center line of the valve 10. As is shown in the FIG. 1, bonnet 15 is generally elliptical in shape. Also as shown, there is an elongated opening 17 in the valve body 11 which is encompassed by bonnet 15 and which communicates with the central cavity portion of the bonnet 15 to accommodate the movement of the sliding plate 16 in and out of the valve body 11 and to gain access to the valve internals when necessary for repairs.

Extending from the bonnet 15 through opening 17 into the valve body 11 is an orifice plate 20. The portion of the orifice plate 20 located within the valve body 11 has a central opening or orifice for the passage of fluid therethrough. As can be seen, orifice plate 20 has a seating surface 21 facing the flow of incoming fluid. Lower and upper guide means 18 and 19, respectively, are connected to, and preferably are integral with, the orifice plate 20 and extend with the plate 20 into the cavity defined by bonnet 15. Importantly, the orifice plate 20 is inclined at an angle, $\alpha$, with respect to the vertical axis of the valve 10. The angle $\alpha$ is varied to achieve a predetermined seating force between the sliding plate 16 and the seating surface 21 of the orifice plate 20 due to the weight of the plate. Basically, the seating force F is approximately equal to $W\sin\alpha$ where W is the weight of the sliding plate, $W_P$ minus the weight of the plate, $W_G$, carried by the lower guide 18.

Figure 2:
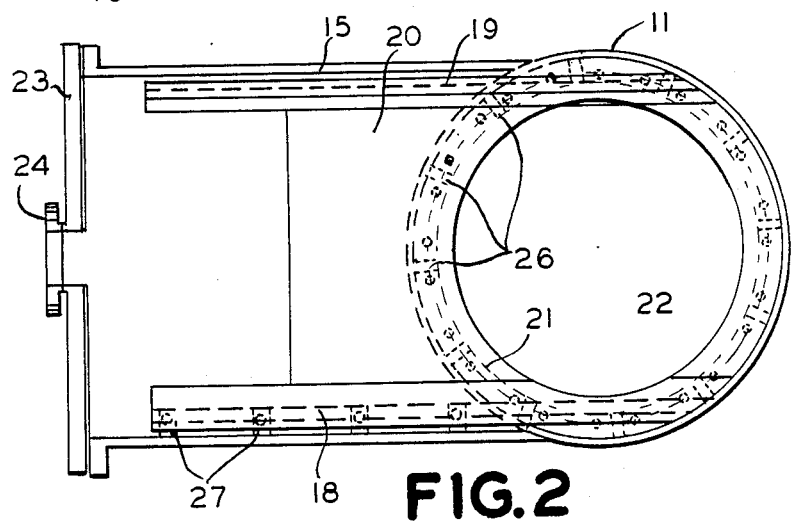
FIG. 2 is a schematic view, partly in section, taken along lines 2—2 of the valve of FIG. 1 but with the sliding plate removed for greater clarity.

In the FIG. 2 schematic, the sliding plate 16 is not included for greater clarity. As can be seen in FIG. 2, the orifice plate 20 with its central opening or orifice 22, has a seating surface 21 substantially in the shape of an annular ring within the valve body 11. Also, as can be seen, the orifice plate 20 extends into the central area of bonnet 15. Lower and upper guide means 18 and 19, which are integral with the orifice plate 20, preferably extend beyond the length of plate 20 into bonnet 15 to provide a support and guidance mechanism for the sliding plate 16. Bonnet 15 is provided with a cap 23 having an appropriate packing connection 24 through which a valve stem (not shown) extends for engagement with the sliding plate 16 to execute the positioning of the sliding plate in its open or closed position. Supporting the orifice plate 20 within the valve body 11 is an orifice support ring 25, preferably backed by a plurality of gussets 26. Optionally, and preferably, the lower guide means 18 is provided with a plurality of guide support means 27.

Figure 3:
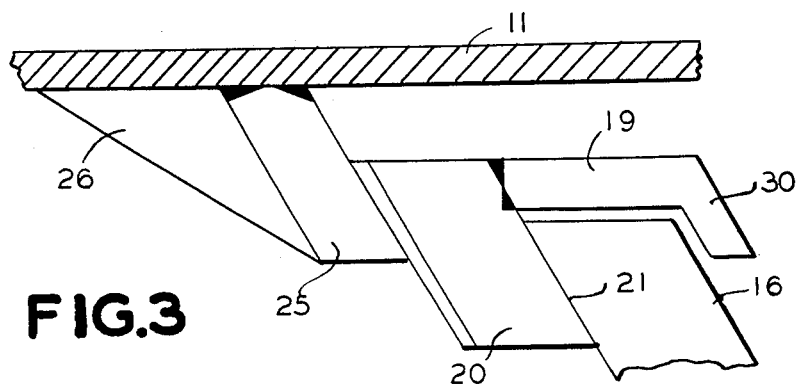
FIG. 3 is a detailed view of the lower portion of the orifice plate, support guide means, and sliding plate of the valve of the present invention.

FIG. 3 shows in detail that the orifice plate 20 is supported by means of orifice support ring 25 and ultimately gussets 26. The seating surface 21 of the orifice plate 20 faces the incoming flow of fluid through the valve body. Guide means 18 is connected to and preferably integral with the orifice plate 20 and extends upwardly at an angle, β, from the horizontal to provide a supporting surface 28 on which the base of sliding plate 16 rests. As shown, the lower surface of sliding plate 16 is inclined to match with supporting surface 28.

Also, as can be seen in FIG. 3, the lower guide 18 has an upwardly extending fence portion 29 inclined at substantially the same angle as that of the orifice plate 20, defining therebetween a generally U-shaped channel for the acceptance of the lower portion of sliding plate 16. The distance between the seating surface 21 and the inner surface of the fence 29 is at least sufficient to accommodate the width of sliding plate 16 and indeed may be slightly greater than that necessary to accommodate the width of sliding plate 16. It is particularly preferred that the lower edge surfaces of plate 16 be chamfered, i.e., provided with radii, such as shown at points a and b, to prevent binding of plate 16.

Figure 4:
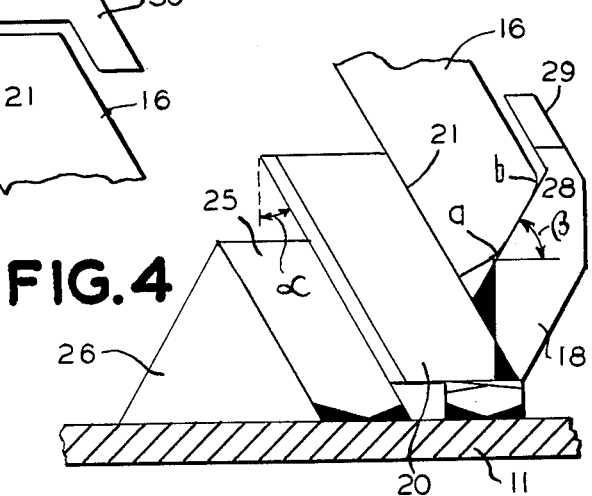
FIG. 4 is a detailed view of the upper portion of the orifice plate, support guide, and sliding plate of the valve of the present invention.

Turning now to FIG. 4, orifice plate 20 is supported by orifice support plate 25 and ultimately gussets 26. Upper guide means 19 is connected to and preferably integral with orifice plate 20 and includes a downwardly-extending fence 30 inclined at substantially the same angle as that of orifice plate 20, defining a generally U-shaped channel between the seating surface 21 of the orifice plate 20 and the inner surface of the fence 30 to accommodate the top portion of slide member 16, thereby providing means for guiding the slide plate 16 when it is moved in and out of the valve body 11.

Figure 5:
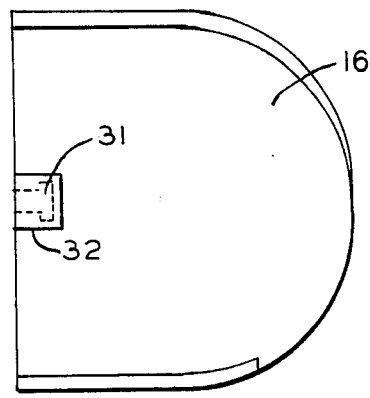
FIG. 5 is a front elevation, partly in perspective, of the sliding plate of the valve of the present invention.

Referring now to FIG. 5, sliding plate 16 is provided with a T-slot 31 for engagement of a valve stem (not shown) for moving the sliding plate 16 in and out of the valve body. Other means, of course, may be used for moving the plate 16 during operation of the valve. In any event, in the embodiment shown, the T-slot 31 is provided with a cover plate 32. Sliding plate 16 is curved at its distal end so as to fit sufficiently within valve body 11 to completely cover the orifice 22 and seating surface 21 of orifice plate 20 when the valve is closed.

As indicated previously in connection with FIG. 1, the orifice plate 20 is arranged at an angle, α, within the valve body 11 so as to achieve a predetermined seating force between the slide 16 and the seating surface 21 of the orifice plate 20. The seating force is approximately equal to Wsinα where W is the weight of the disk, $W_P$, minus the weight of the disk, $W_G$, carried by the lower guide. The angle β of the supporting surface 28 of guide means 18 as shown in detail in FIG. 3 therefore is selected to minimize the magnitude of $W_G$ and to keep the slide in contact with the seating surface 21. It should be apparent then that the angle β may vary to achieve a predetermined seating force depending upon the weight of the sliding plate 16 and the angle β of guide means 18. In general, however, α will be in the range of about 15° to about 45° and β will be in the range of about 10° to about 40° greater than α. It also should be apparent that additional seating force is provided by the differential pressure across the valve.

The valve of the present invention has particular utility in pipe systems which require positive shut off of high temperature gases such as in pipe systems used in fluid catalytic cracking, and the like.

What is claimed is:

1. A sliding plate valve comprising:
   a valve body with a longitudinal flow passage therethrough, and a port in the side thereof;
   an orifice plate extending horizontally through the port into the flow passage of the valve body and transverse to the longitudinal axis of the valve body, said orifice plate having a central opening defined by an inclined seating surface, said opening and said seating surface located in the flow passage of the valve and said seating surface facing the flow of fluid under conditions of use;
   an incline sliding plate positioned for bearing on the inclined seating surface of the orifice plate;
   said orifice plate having guide means located at the bottom thereof, said orifice plate, said guide means and said sliding plate being inclined at an angle variably selected to provide a predetermined seating force which is a function of the weight of the sliding plate and said angle of each of said orifice plate, said sliding plate and said guide means to thereby minimize the magnitude of the weight of said sliding plate carried by said guide means.

2. The valve of claim 1 including guide means for guiding the sliding plate when it is moved in and out of said valve body.

3. The valve of claim 2 wherein said guide means are located at the top and bottom of said orifice plate and the guide means at the bottom include a supporting surface for said sliding plate.

4. The valve of claim 3 wherein said supporting surface for said sliding plate is inclined at an angle sufficient to provide a predetermined seating force between said seating surface of the orifice plate and the sliding plate.

5. The valve of claim 4 wherein said orifice plate and said sliding plate are inclined at an angle measured from the vertical of between about 15° to about 45°.

6. The valve of claim 5 wherein the guide means are integral with said orifice plate.

7. The valve of claim 5 wherein said sliding plate is chamfered at its lower edges.

8. The valve of claim 5 including a bonnet covering said port and wherein said orifice plate and said guide means extend into said bonnet.

9. A sliding plate valve comprising:
   a valve body with a longitudinal flow passage therethrough;
   an opening in the side of said valve body;
   a horizontally disposed valve bonnet covering said opening in said valve body;
   an orifice plate extending from the bonnet into the flow passage of the valve body and transverse to the longitudinal flow passage, said orifice plate having a central opening within the valve body, said central opening being surrounded by an inclined seating surface, said seating surface being located within the flow passage of the valve body and facing the flow of fluid under conditions of use;
   a reciprocally removable inclined plate positioned for bearing on the seating surface of said orifice plate when said valve is closed, guide means located at the top and bottom of said orifice plate, said guide means located at the bottom having an inclined supporting surface for said sliding plate, said giude means extending from said bonnet into said valve;

said orifice plate said sliding plate and said inclined surface of said guide means, each inclined at an angle variably selected to provide a predetermined seating force between said orifice plate seating surface and said sliding plate which is a function of the weight of said sliding plate and said angle of each of said orifice plate, said sliding plate and said supporting surface of said guide means to thereby minimize the magnitude of the weight of said sliding plate carried by said guide means.

10. The valve of claim 9 wherein said orifice plate is inclined at an angle measured from the vertical of about 15° to about 45° and wherein said supporting surface is inclined at an angle measured from the horizontal of about 10° to about 40° greater than the angle of the orifice plate.

* * * * *